E. A. MARSH.
COMPENSATION BALANCE DEMONSTRATOR.
APPLICATION FILED MAR. 3, 1915.
1,149,847.
Patented Aug. 10, 1915.
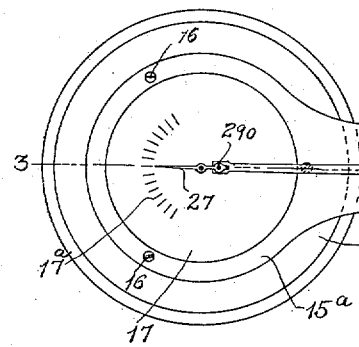
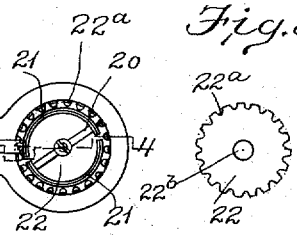
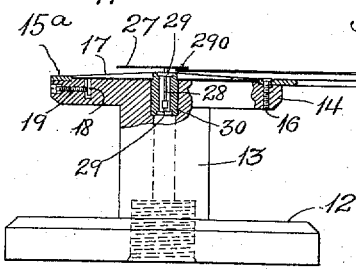
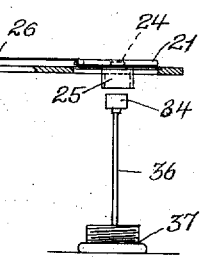
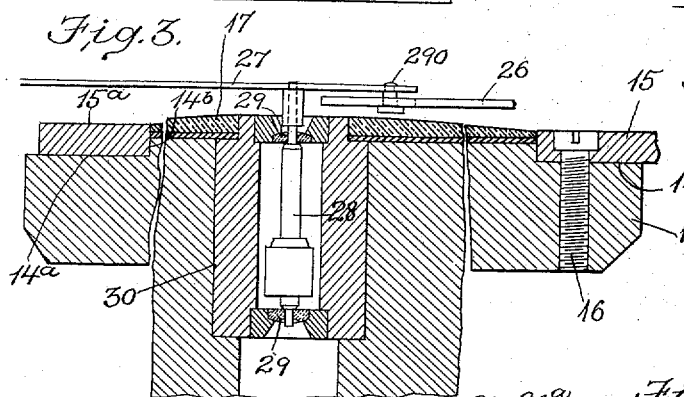
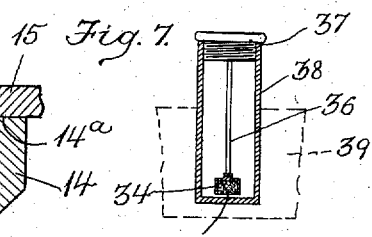
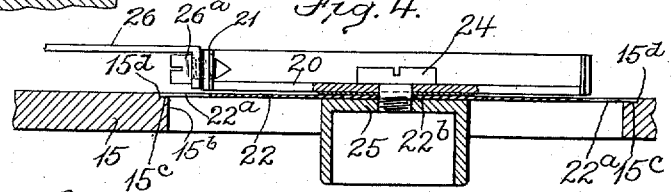
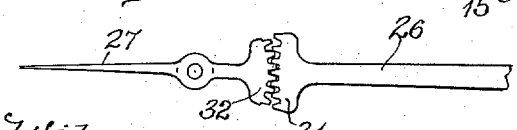
Witnesses:
H. A. Rahn
E. P. Brannen
Inventor
Edward A. Marsh
by Wright Brown Quinby & May
Attorneys

UNITED STATES PATENT OFFICE.

EDWARD A. MARSH, OF NEWTON, MASSACHUSETTS, ASSIGNOR TO WALTHAM WATCH COMPANY, OF WALTHAM, MASSACHUSETTS, A CORPORATION OF MASSACHUSETTS.

COMPENSATION-BALANCE DEMONSTRATOR.

1,149,847.  Specification of Letters Patent.  Patented Aug. 10, 1915.

Application filed March 3, 1915. Serial No. 11,746.

*To all whom it may concern:*

Be it known that I, EDWARD A. MARSH, a citizen of the United States, and a resident of Newton, in the county of Middlesex and State of Massachusetts, have invented certain new and useful Improvements in Compensation-Balance Demonstrators, of which the following is a specification.

It is a well known fact, in the action of natural forces, that metals, when subjected to changes of temperature, change in bulk, the amount of change varying according to the kind of metal, or alloy. Careful and repeated tests, with their recorded results, have determined the amount of expansion per Fahrenheit degree of change in all the principal metals and in a large number of alloys. It is also a well known fact that the period of vibration of a free pendulum is determined by the length of the pendulum. This fact of the uniformity of pendulum vibration has long been utilized for the constant movement of the mechanism of various forms of time-pieces.

Inasmuch as frequent changes in temperature cannot be absolutely avoided, it is evident that the period of vibration of a simple pendulum cannot be constantly maintained.

To overcome the disturbing effects of temperature changes compound pendulums have been devised, in which the differing rates of expansion of various metals and alloys have been so utilized that, while the actual length of the pendulum would vary, its center of gravity could be so moved that the vibrational length could be maintained constant in period.

The same laws govern the vibrations of the balance wheels of pocket watches, for the balance wheel is the equivalent of the pendulum, in action.

Without further reference to the simple pendulum, it is desired to briefly explain the method and the means by which the balance wheels of watches may be so constructed as to maintain a constant period of vibration in changes of temperature. It may suffice to say that inasmuch as brass (an alloy) has a much greater co-efficient of expansion than steel, that fact is utilized in the construction of watch balances, in order to provide an automatic compensation for the effects of temperature changes, so that the effective diameter of the balance may remain constant. To this end the balance is constructed with its two arms and rim of steel, and adding to the outside of the steel rim a band of brass somewhat thicker than the inclosed steel rim. This bi-metallic rim is severed on opposite sides at points near the arms, thus leaving two portions of the rim, each with a free and unsupported end, so that it is free to move either toward or from the center of the balance. When a balance thus constructed is submitted to the influence of increased heat, the brass portion of the rim (which is firmly attached to the steel by fusion) will by its greater degree of expansion cause the free end of the rim to curl inward, thus reducing the effective diameter of the balance. Of course when the balance is exposed to temperature below normal the contrary movement of the balance rim would be produced. For the practical purpose of securing the needful amount of diametral change in watch balances, the actual amount of change in the balance is so slight as to be almost imperceptible to the eye.

The purpose of my invention is to provide a means of indicating the changes in the form of watch balances caused by variations in their temperature, so that the action can be readily apparent to anyone. I am aware that a device for showing the effect of heat upon watch balances was patented several years ago, but it was inconvenient in use and unsuited for ready use.

My invention is embodied in an apparatus comprising a compensation balance, an elongated arm having balance holding means formed and arranged to support a segment of the balance in position to be heated by a heating instrumentality, such as an alcohol lamp or torch located at one side of the arm and balance, and an elongated finger attached to said segment and projecting over the arm, said finger being movable laterally by a movement of the balance segment caused by its expansion or contraction, and graphically demonstrating such movement.

The invention is also embodied in an apparatus organized as above indicated, the arm being provided with means whereby it is supported to hold the balance and its holding means above a space in which the heating instrumentality may be located.

The invention is also embodied in an apparatus organized as above indicated and including a compound pointer, one member of which is said finger, while the other member is pivoted and engaged with the free end of the finger, the arrangement being such that an amplified expansion or contraction indicating movement is imparted to the pivoted member.

Of the accompanying drawings forming a part of this specification: Figure 1 represents a top plan view of a demonstrator embodying the invention; Fig. 2 represents a side view of the same; Fig. 3 represents an enlarged section on line 3—3 of Fig. 1; Fig. 4 represents an enlarged section on line 4—4 of Fig. 1; Fig. 5 represents a plan view of the heat conducting bed plate hereinafter referred to; Fig. 6 represents a fragmentary plan view showing a modification; Fig. 7 represents a sectional view of a suitable torch for heating the balance, and a liquid fuel reservoir in which the same may be stored when not in use.

The same reference characters indicate the same or similar parts in all the views.

In the drawings, 12 represents a preferably circular base adapted to rest on a table or other horizontal support and bearing an upright standard 13 preferably circular and of smaller diameter than the base.

The standard and base support an elongated arm which projects a considerable distance from one side of the standard and base, and overhangs an unobstructed space in which a heater such as an alcohol lamp or torch, supported by the table, may be located. As here shown, the said arm is formed by a circular member or head 14 on the standard 13 and a thin elongated member 15 attached by screws 16 to said head, the member 15 having its inner end enlarged and cut out to form a ring $15^a$ which receives said screws, and bears on a depressed annular seat $14^a$ formed on the upper side of the head, the head being provided at the inner edge of said seat with an annular shoulder $14^b$ projecting into the ring $15^a$. The height of said shoulder is preferably less than the thickness of the arm member 15, so that the inner margin of the ring $15^a$ forms the margin of a circular recess in which is closely fitted a circular dial 17 on which is inscribed an arcuate scale $17^a$. Said dial may be provided with studs or feet 18 similar to the feet of a watch dial, inserted in sockets in the head 14 and secured by clamping screws 19.

The outer end of the arm member 15 is provided with means for holding a compensation balance of ordinary form and construction, composed of the usual centrally perforated cross-bar forming the usual arms 20 and a hub connecting said arms and laminated segments 21, each attached at one end to one of the arms 20, said holding means being formed and arranged to support at least one of the segments of the balance in position to be heated by a heater located in the space under the arm member 15, and permit said segment to expand and contract.

The preferred form of said holding means may be described as follows: The outer end of the arm member 15 is provided with a circular opening or orifice $15^b$, the diameter of which is somewhat greater than that of the balance, said orifice being surrounded by a depressed annular seat $15^c$ formed on the upper side of the arm member 15 and surrounded by an annular shoulder $15^d$. 22 represents a thin metal bed plate or disk formed to substantially cover the orifice $15^b$ and bear on the seat $15^c$, the plate being firmly secured and prevented from turning. The margin of the plate 22 is preferably provided with notches $22^a$ of sufficient depth to form heat-conducting passages arranged in a circular series coinciding with the segments of the balance.

The plate 22 is provided centrally with an orifice $22^b$ (Fig. 5) adapted to receive a screw 24 which enters the central orifice in the hub portion of the balance arms. The screw is provided with a nut 25 which bears on the under side of the plate 22 and cooperates with the head of the screw 24 in firmly securing the balance arms to the plate, leaving the balance segments free to expand and contract.

26 represents a narrow elongated finger attached rigidly at one end by a screw $26^a$ to one of the balance segments, and projecting therefrom over the arm member 15. Said finger has the general characteristics as to material and form of a clock hand, and is supported wholly by the segment to which it is attached, and moved laterally over the arm member 15 by movements of the segment caused by expansion and contraction, the length of the finger being such that movements of its free end are of much greater amplitude than those of the balance segment, so that when the segment is moved by the action of heat upon it, although the relatively slight movement of the segment is hardly discernible by the eye, the resulting movement of the finger relatively to the portion of the arm over which it projects can be plainly discerned. The finger may constitute the only pointing or indicating instrumentality. I prefer however to utilize the finger as a member of a compound pointer, the other member of which is a relatively short two-armed pointer member 27, preferably formed like the seconds hand of a watch and attached to a staff 28, which is journaled in bearings 29 in a tubular holder 30 inserted in a socket formed for its reception in the standard 13. The staff is located at the center of the dial 17, and projects through the central orifice of the dial, the pointer member 27 being attached to the staff above the dial. The longer arm of the member 27 projects over the dial scale and its shorter arm is engaged with the free end of the finger or elongated pointer member 26, preferably by a stud 290 attached to the shorter arm of the member 27 and entering a slot in the member 26. The movements of the free end of the member 26 are therefore transmitted to the member 27, the longer arm of the latter having a considerably greater lateral movement than the free end of the member 26. The members 26 and 27 may be otherwise connected, as by gear segments 31, 32, formed on their meeting ends, as shown by Fig. 6.

The described apparatus is not intended nor adapted for use as an instrument of precision, to ascertain the exact degrees of expansion and contraction of a balance under given changes of temperature, its object being to demonstrate quickly and convincingly in an elementary way and by the aid of a simple heater, such as an alcohol lamp or torch, the fact that the form of the segments of a watch balance is varied by sudden increments of heat. The described construction is preferably such that the balance supporting arms must be held in a substantially horizontal position in the path of heat or hot air rising from the heater, the heat acting quickly through the thin bed plate on a segment of the balance. Hence the balance and pointer have no tendency to move by gravity during the demonstrating operation, so that the balance may be secured to the holder at its center only by means such as the screw 24 and nut 25, said means offering no obstruction to the direct action of heat on the pointer-carrying balance segment. The balance constitutes a permanent part of the demonstrator.

I have shown by Figs. 2 and 7 a suitable form of torch for heating the balance, said torch including a cup 34 containing an absorbent filling 35, preferably of asbestos, a stem 36, and a base 37. The capacity of the cup is such that it will hold a limited quantity or charge of liquid fuel, such as alcohol, sufficient to heat the balance only long enough for the desired demonstration, the flame expiring before it has had time to injuriously heat the balance and the holding means.

The base 37 is preferably formed as a cover or plug adapted to be screwed into the mouth of a fuel reservoir 38, the torch being placed in an inverted position in said reservoir, as shown by Fig. 7, and absorbing a charge of fuel. When the torch is removed from the reservoir, placed upright under the balance as shown by Fig. 2, and ignited, the flame is spread by the nut 25 and acts on the bed plate 22, and through the latter on the balance, the duration of the flame being limited.

The reservoir 38 may be stored with the apparatus in a box, a portion 39 of which is represented by dotted lines in Fig. 7.

Having described my invention, I claim:

1. An expansion and contraction demonstrator comprising a compensation balance having segments, an elongated arm having balance-holding means confining a portion of the balance at one side of the arm and leaving at least one of its segments free to expand and contract, said elongated arm being adapted to be held horizontally and provided with means permitting heat to ascend from a point below the arm and impinge on said segment when the arm is held horizontally, and an elongated finger attached to said segment and projecting therefrom over said elongated arm.

2. An expansion and contraction demonstrator comprising a compensation balance having segments, an elongated arm having an opening of greater diameter than the balance, a thin bed plate secured in said opening and supporting the balance, means securing the center of the balance to the center of the bed plate, the under side of the plate being in the path of heat rising from a heating instrumentality located below the arm, and an elongated finger attached to said segment and projecting therefrom over said arm.

3. An expansion and contraction demonstrator comprising a compensation balance having segments, an elongated arm having an opening of greater diameter than the balance, a thin bed plate secured in said opening and supporting the balance, means securing the center of the balance to the center of the bed plate, leaving the segments free to expand and contract, and an elongated finger attached to a segment of the balance and projecting therefrom over said arm, the bed plate being provided with heat-conducting openings coinciding with said segment, and permitting heat ascending from the under side of the elongated arm to impinge on said segment.

4. An expansion and contraction demonstrator comprising a compensation balance having segments, an elongated arm having balance-holding means confining the center of the balance and leaving the segments free to expand and contract, said elongated arm being adapted to conduct heat ascending from a point below it to a segment of the balance, and an elongated finger attached to said segment and projecting therefrom over said arm, the arm being provided with supporting means arranged to support the balance-holding means over a space in which said heating instrumentality may be located.

5. An expansion and contraction demonstrator comprising a compensation balance having segments, an elongated arm having balance-holding means formed and arranged to support a segment of the balance in position to be heated by a heating instrumentality located at one side of the arm and balance, and an elongated finger attached to said segment and projecting therefrom over said arm, the arm being provided at one end with a standard formed and arranged to support the balance-holding means over a space in which said heating instrumentality may be located.

6. An expansion and contraction demonstrator comprising a compensation balance having segments, an elongated arm having balance-holding means at one end portion, formed and arranged to confine a portion of the balance and support a segment of the balance in position to be heated by a heating instrumentality located at the under side of the arm and balance, a standard attached to the opposite end portion of said arm, formed and arranged to support the arm and balance over a space in which said heating instrumentality may be located, a staff journaled in said standard, a pointer member secured to said staff, and an elongated finger attached to said segment and engaged with said pointer member.

7. An expansion and contraction demonstrator comprising a compensation balance having segments, an elongated arm having balance-holding means at one end portion, formed and arranged to confine a portion of the balance and support a segment of the balance in position to be heated by a heating instrumentality located at one side of the arm and balance, a standard attached to the opposite end portion of said arm, formed and arranged to support the arm and balance over a space in which said heating instrumentality may be located, a staff journaled in said standard, a pointer member secured to said staff, a dial secured to said standard and coöperating with said pointer member, and an elongated finger attached to said segment and engaged with said pointer member.

8. An expansion and contraction demonstrator comprising a compensation balance having segments, an elongated arm having balance-holding means formed and arranged to support a segment of the balance in position to be heated by a heating instrumentality located at one side of the arm and balance, an elongated finger attached to said segment and projecting therefrom over said arm, and a torch adapted to stand upright under the arm and balance, and adapted to hold a limited charge of fuel.

In testimony whereof I have affixed my signature, in presence of two witnesses.

EDWARD A. MARSH.

Witnesses:
C. F. BROWN,
P. W. PEZZETTI.